Nov. 25, 1924.
E. L. THOMSON
DISTANT STEERING CONTROL
Original Filed Sept. 9, 1922
1,516,994
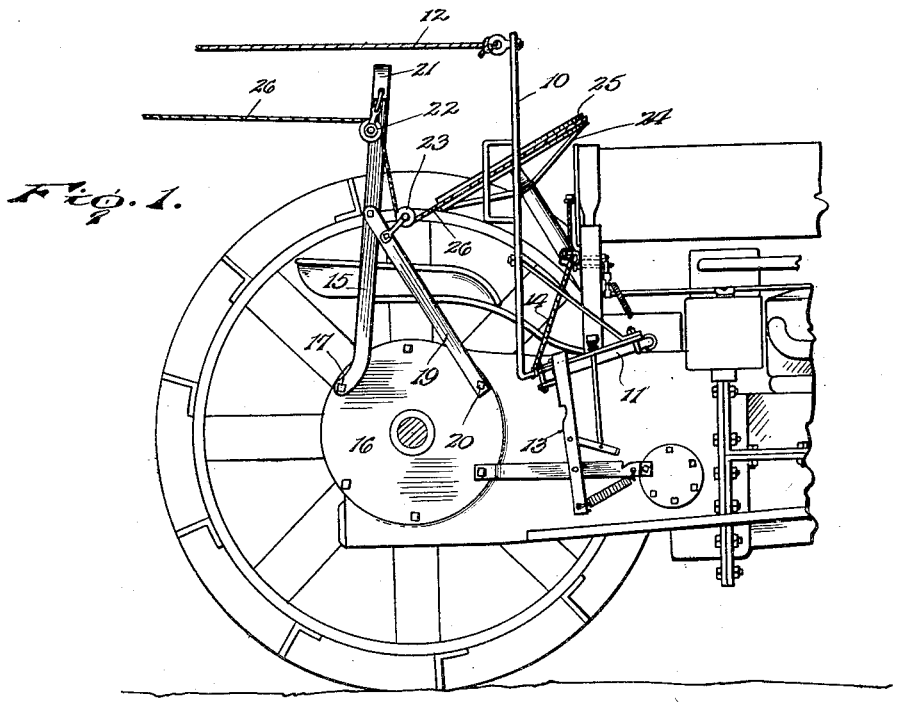
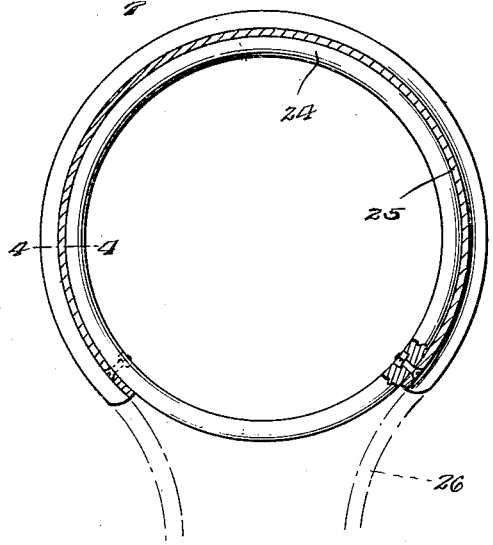
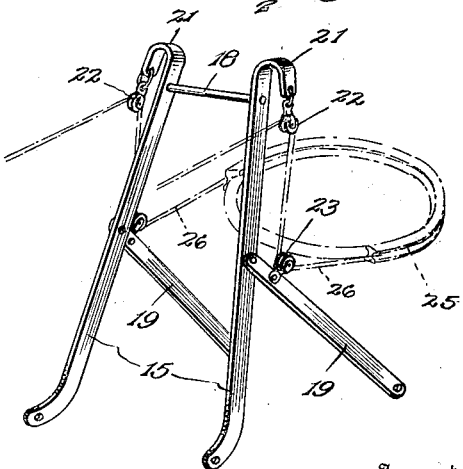
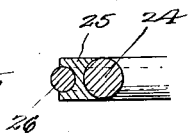
Inventor
E. L. Thomson.
By Lacey & Lacey, Attorneys Patented Nov. 25, 1924.

1,516,994

UNITED STATES PATENT OFFICE.

EARL L. THOMSON, OF DUNKIRK, OHIO.

DISTANT STEERING CONTROL.

Original application filed September 9, 1922, Serial No. 587,145. Divided and this application filed March 23, 1923. Serial No. 627,139.

*To all whom it may concern:*

Be it known that I, EARL L. THOMSON, citizen of the United States, residing at Dunkirk, in the county of Hardin and State of Ohio, have invented certain new and useful Improvements in Distant Steering Controls, of which the following is a specification.

This invention relates to an improved distant steering control for tractors, being a division of my pending application for distant tractor control, filed September 9, 1922, Serial No. 587,145.

The invention seeks, among other objects, to provide a distant steering control which may be readily attached to a tractor and which will provide an efficient means for guiding the tractor through the medium of the steering wheel of the tractor.

Other and incidental objects will appear hereinafter.

In the drawings:

Figure 1 is a fragmentary side elevation showing my improved steering control in connection with a conventional tractor, Figure 2 is a detail sectional view particularly showing the channel member which is mounted upon the steering wheel of the tractor to accommodate the flexible guide member employed, Figure 3 is a perspective view particularly showing the pulley bracket employed, and Figure 4 is a detail sectional view on the line 4—4 of Figure 2.

Referring now more particularly to the drawings, I have shown my improved steering control in connection with a Fordson tractor and have illustrated the tractor equipped with my improved distant clutch and throttle control, the clutch and throttle control forming the subject matter of the parent application. It is, therefore, unnecessary to enter into a detailed description of the clutch and throttle control herein. However, it may be noted that the clutch and throttle control includes a lever 10 which is attached to the clutch pedal 11 of the tractor and connected to said lever is a rope or other flexible element 12 providing means for rocking the lever and depressing the pedal. Associated with the lever is a latch mechanism indicated generally at 13, which, when the pedal is depressed, automatically functions to lock the pedal in depressed position and embodies means for again freeing the pedal for upward movement incident to a further downward strain upon the pedal by means of the lever 10. Accordingly, the clutch of the tractor may be readily rendered active or inactive and attached to the pedal is a rope or other flexible element 14 operatively connected with the throttle control rod of the tractor so that when the clutch pedal is depressed for releasing the clutch, the throttle will be moved toward closed position while, when the clutch pedal is permitted to return for engaging the clutch, the throttle will be again opened for accelerating the speed of the engine. Thus, the tractor may be stopped and started from a point at a distance therefrom.

Coming now more particularly to the subject of the present invention, I employ a pulley bracket, illustrated in detail in Figure 3 of the drawings. As shown, this bracket includes spaced upwardly converging arms 15 which straddle the differential housing 16 of the tractor and are secured at their lower ends to the housing by a pair of the usual bolts upon the housing, said bolts being indicated at 17. Connecting the arms near their upper ends is a cross rod 18 and extending forwardly from the arms are braces 19 bolted at their lower ends to the differential housing by the customary bolts of the housing, said bolts being indicated at 20. Thus, these braces will function to rigidly sustain the bracket in upright position. At their upper end portions, the arms 15 are bent outwardly and laterally to provide overhanging terminals 21 and connected to said terminals are pulleys 22 while similar pulleys 23 are mounted upon the braces 19 near the upper ends thereof. The steering wheel of the tractor is indicated at 24 and bolted or otherwise secured at its ends to the rim of the wheel is a split channeled guide member 25 the inner face of which is, as shown in Figure 4, concave in cross section so that the guide member thus snugly fits the rim. Engaging the guide member to extend about the steering wheel is a rope or other suitable flexible element 26, the end portions of which are, as shown in dotted lines in Figure 3, trained under the pulleys 23 and over the pulleys 22, the rope being of a length to extend rearwardly from the tractor to a load to be pulled thereby. Accordingly, an operator riding upon the load may, by pulling first upon one end of the rope and then upon the other end thereof, turn the steering wheel of the tractor in either one direction or the other for guiding the tractor, the rope being held under tension sufficient to maintain said rope in tight frictional engagement with the guide member 25.

Having thus described the invention, what is claimed as new is:

A distant tractor steering control including a guide member for attachment to the steering wheel of a tractor, spaced arms having their lower ends straddling the differential housing of the tractor and secured to said housing, a cross rod extending transversely between said arms near their upper ends rigidly connecting the arms with each other, braces connected at their upper ends to the arms to incline forwardly and downwardly therefrom and secured at their lower ends to the housing sustaining the arms in upright position, the upper end portions of the arms being bent outwardly and laterally to form overhanging terminals, a pair of pulleys carried by said terminals, a second pair of pulleys mounted upon the upper end portions of said braces, and a flexible element trained around said pairs of pulleys and having its intermediate portion engaged in said guide member whereby said element may be operated for turning the steering wheel.

In testimony whereof I affix my signature.

EARL L. THOMSON. [L. S.]